United States Patent [19]

Yokota et al.

[11] Patent Number: 4,472,635

[45] Date of Patent: Sep. 18, 1984

[54] RADIOGRAPHIC INTENSIFYING SCREEN

[75] Inventors: Kazuto Yokota; Mitsuo Nakamura, both of Yokohama, Japan

[73] Assignee: Tokyo Shibaura Denki Kabushiki Kaisha, Kawasaki, Japan

[21] Appl. No.: 426,135

[22] Filed: Sep. 28, 1982

[30] Foreign Application Priority Data

Oct. 23, 1981 [JP] Japan ............................... 56-169607

[51] Int. Cl.[3] ............................................ G01J 1/58

[52] U.S. Cl. ............................... 250/486.1; 250/483.1

[58] Field of Search ................ 250/483.1, 486.1, 488.1

[56] References Cited

U.S. PATENT DOCUMENTS

| | | | |
|---|---|---|---|
| 2,243,828 | 5/1941 | Leverenz | 250/486.1 |
| 2,310,852 | 2/1943 | Leverenz | 250/486.1 |
| 2,412,654 | 12/1946 | Sadowsky | 250/486.1 |
| 4,088,894 | 5/1978 | Rabatin | 250/483.1 |
| 4,316,092 | 2/1982 | Rabatin | 250/483.1 |

*Primary Examiner*—Bruce C. Anderson
*Attorney, Agent, or Firm*—Cushman, Darby and Cushman

[57] ABSTRACT

A radiographic intensifying screen having improved modulation transfer function and/or sensitivity. The radiographic intensifying screen of the present invention comprises a support, a phosphor layer formed on the support, a protective film formed on the phosphor layer, wherein the phosphor layer includes a small phosphor particles layer at its support side consisting essentially of small phosphor particles with an average grain size of about 4 μm or less and a binding agent; and a mixed large and small phosphor particles layer at its protective film side consisting essentially of large phosphor particles with an average grain size ranging from about 7 to 20 μm, small phosphor particles present in the interstices of the large phosphor particles and with an average grain size of about 4 μm or less and a binding agent.

5 Claims, 3 Drawing Figures

RADIOGRAPHIC INTENSIFYING SCREEN

BACKGROUND OF THE INVENTION

I. Field of the Invention

This invention relates to a radiographic intensifying screen.

II. Description of the Prior Art

Radiographic photographing is usually carried out by overlapping a photosensitive film and a pair of radiographic intensifying screens. The radiographic intensifying screen comprises a support, a phosphor layer formed on the support and a comparatively thin, transparent protective film formed on the phosphor layer. The phosphor layer consists of fine phosphor particles and a binding agent for holding these particles together.

When taking a radiographic picture, the photosensitive film is sandwiched between a pair of radiographic intensifying screens with the transparent protective film of the radiographic intensifying screen in contact with the photosensitive film. The laminated system is put in a cassette, and is irradiated with radioactive rays from outside of the cassette. When radioactive rays are incident on the phosphor of the radiographic intensifying screen, fluorescence is produced. This fluorescence reaches the photosensitive film to sensitize the film.

It has been desired that as much light as possible be emitted from the phosphor layer and should irradiate the photosensitive film with a high degree of sharpness. To this end, it has been proposed to vary the grain size of the phosphor particles constituting the phosphor layer in the direction of thickness of the phosphor layer, as disclosed in, for instance, U.S. patent specification No. 4,039,840. According to this patent, phosphor particles are arranged such that the grain size of the particles increases from the support side of the radiographic intensifying screen toward the protective film side thereof.

By the provision of such a grain size distribution, the modulation transfer function of the intensifying screen is promoted since the light path of the reflection and diffusion, in the phosphor layer, of the fluorescent light emitted from the phosphor is shortened and therefore more fluorescent light can be taken up from the surface of the phosphor layer. In the structure of the phosphor layer having such a grain size distribution, however, the selection of the grain size gives large influence to the modulation transfer function of the radiographic intensifying screen. For example, when the average grain size of the large phosphor particles in the surface (the side from which emitted fluorescent light is taken up) of the phosphor layer is extremely large, or when the grain size of the small phosphor particles in the support side of the phosphor layer is not so different from that of the large phosphor particles in the surface of the phosphor layer, the modulation transfer function of the radiographic intensifying screen is not improved.

SUMMARY OF THE INVENTION

The object of the invention is to provide a radiographic intensifying screen which has high sensitivity and/or high modulation transfer function compared to the prior art radiographic intensifying screen.

According to the invention, the sensitivity and the modulation transfer function of the radiographic intensifying screen are enhanced by optimize the grain size of the large phosphor particles in the surface of the phosphor layer and the grain size of the small phosphor particles in the support side of the phosphor layer, and by further distributing the small phosphor particles into the interstices of the large phosphor particles. That is, the present invention provides a radiographic intensifying screen comprising a support; a phosphor layer formed on the support; a protective film formed on the phosphor layer; wherein the phosphor layer includes a small phosphor particles layer at its support side consisting essentially of small phosphor particles with an average grain size of about 4 μm or less and a binding agent; and a mixed large and small phosphor particles layer at its protective film side consisting essentially of large phosphor particles with an average grain size ranging from about 7 to 20 μm, small phosphor particles present in the interstices of the large phosphor particles and with an average grain size of about 4 μm or less and a binding agent.

The radiographic intensifying screen of the present invention allow superior sensitivity and/or sharpness compared to the radiographic intensifying screen of the prior art.

DETAILED DESCRIPTION OF THE PREFERRED EMBODIMENTS

Figure 1:
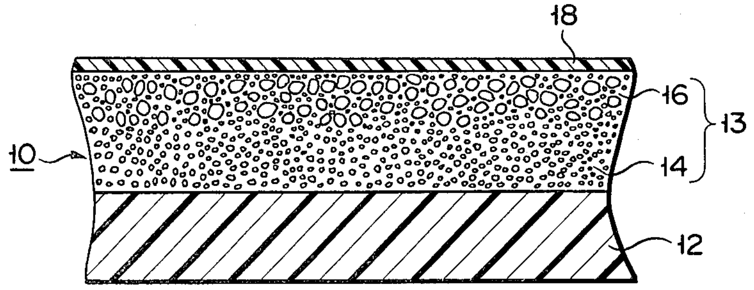
FIG. 1 is a sectional view schematically showing a radiographic intensifying screen in accordance with the invention.

The radiographic intensifying screen 10 according to the invention includes a support 12. For the support 12, what has hitherto been widely adopted for radiographic intensifying screens may be used. Therefore, the support 12 may be formed of, for example, a polyester film. The thickness of the support 12 is usually about 100 to 400 μm.

A phosphor layer 13 is formed on the support 12. The phosphor layer 13 includes a small phosphor particles layer 14 (hereinafter referred to as "small particles layer" at its support side and a mixed large and small phosphor particles layer 16 (hereinafter referred to as "mixed particles layer") at its protective film (later described in detail) side.

The small particles layer 14 is formed on the support 12. The phosphor constituting the small particles layer 14 is the small phosphor particles with an average grain size of about 4 μm or less.

The mixed particles layer 16 is formed on the small particles layer 14. The phosphor constituting the mixed particles layer 16 is the large phosphor particles with an average grain size of about 7 to 20 μm and small phosphor particles with an average grain size of about 4 μm or below. The small phosphor particles are present in the interstices between the large phosphor particles. The fluorescent light from the thus constituted phosphor layer effectively sensitize a phorosensitive film to thereby promoting the sensitivity or the sharpness of an X-ray photograph. The preferred grain size of the large phosphor particles is from about 7 to 12 μm because with this range of grain size especially superior sharpness can be obtained. If the grain size of the small phosphor particles is about 3 μm or less, this effect is further enhanced. The preferred weight ratio between the large and small phosphor particles is from about 85:15 to 95:15.

The large and small phosphor particles are bonded by a suitable binding agent. For the binding agent, materials which have hitherto been used may be employed, for instance, polyvinyl butylal, acryl, nitrocellulose and urethane. For the phosphor, materials which have hitherto been used, for instance, rare earth phosphors such as $Gd_2O_2S/Tb$ and $(Y,Gd)O_2S/Tb$ and calcium tungstate ($CaWO_4$), may be employed.

The weight ratio between the small phosphor particles and the large phosphor particles in the phosphor layer 13 is preferably within a range of about 2:8 and 8:2. The thicknesses of the phosphor layers 13 is preferably within a range of from about 50 to 400 μm.

Further, the small particle phosphor and/or large particle phosphor may be comprised of phosphor particles of two or more different average grain sizes. For example, the large particle phosphor may be a mixture of phosphor particles with an average grain size of about 10 μm and phosphor particles with an average grain size of about 15 μm.

The grain size distribution of phosphor particles is usually normal distribution or substantially normal distribution. Thus, the size of the phosphor particles can be specified in terms of the average grain size.

A transparent protective film 18 is formed on the mixed particles layer 16 as in the prior art radiographic intensifying screen. The thickness of the protective film 18 usually ranges from about 4 to 20 μm. The protective film 18 is, for example, a polyester film.

The radiographic intensifying screen 10 in accordance with the invention can be produced in the following manner.

The large phosphor particles, small phosphor particles and binding agent as mentioned above are mixed together with an organic solvent to obtain a first slurry having a high viscosity of about 5,000 C.P.S. or more. Examples of the organic solvent are alcohols such as butanol, butyl acetate, amyl acetate and acetone. These organic solvent may be suitably selected depending upon the resin of the binding agent used. To obtain a high phosphor particle density of the phosphor layer, the weight ratio between the large phosphor particles and the small phosphor particles is preferably set to be within a range of between about 95:5 and 85:15.

The first slurry is then coated on the protective film 18 using a knife coater. After the coated slurry is forced to be dried, the mixed particles layer 16 can be obtained.

Next, the small phosphor particles and binding agent as mentioned above are mixed together with an organic solvent to obtain a second slurry having a high viscosity of about 5,000 C.P.S. or more. As the organic solvent those substances mentioned above may be used.

The second slurry is then coated on the previously formed mixed particles layer 16 using a knife coater. After the coated slurry is forced to be dried, the small particles layer 14 can be obtained.

Finally, the support 12 is bonded to the small particles layer 14 thus formed by means of thermal press.

In this method, the weight ratio between the large phosphor particles and the small phosphor particles preferably ranges from about 8:2 to 2:8.

The radiographic intensifying screen of the present invention may also be produced using a slurry having a low viscosity of about 500 C.P.S. or less as follows.

The large phosphor particles, small phosphor particles and the binding agent as mentioned above are mixed with an organic solvent to obtain a slurry having a low viscosity of about 500 C.P.S. or less. As the organic solvent, these substances mentioned above may be used. These organic solvents may be suitably selected depending upon the resin of the binding agent used.

Subsequently, a spreading frame is placed on the protective film 18. The slurry prepared in the above manner is then poured into the spreading frame so that is spreads, and it is then left to be gradually dried. As a result, the large phosphor particles fall and settle in a lower layer of the spread slurry. The small phosphor particles partly settle to be found in the interstices between the large phosphor particles. This layer constitutes the mixed particles layer 16. The rest of the small phosphor particles may be found in an upper layer of the spread slurry. In this layer, almost no large phosphor particles are present. This layer constitutes the small particles layer 14. Where the small particles layer 14 and the mixed particles layer 16 are formed in this way, a certain grain size distribution is formed in each of these layers.

Finally, the support 12 is bonded to the small particles layer 14 by means of thermal press.

This method is preferably carried out by using a slurry having a comparatively low viscosity of about 500 C.P.S. or below. This method is hereinafter referred to as the "spreading method".

The radiographic intensifying screen according to the invention may be used in exactly the same manner as with the prior art radiographic intensifying screen.

EXAMPLE 1

Fifty parts by weight of calcium tungstate particles with an average grain size of 9.9 μm, 5 parts by weight of calcium tungstate particles with an average grain size of 2.7 μm, 6 parts by weight of nitrocellulose and 34 parts by weight of butyl acetate were mixed together to obtain a first slurry.

This slurry was coated on a polyester film as a protective film using a knife coater, and butyl acetate was then forced to be evaporated to obtain the mixed particles layer.

Then, 45 parts by weight of calcium tungstate particles with an average grain size of 2.7 μm, 1 part by weight of nitrocellulose and 5.5 parts by weight of butyl acetate were mixed together to obtain a second slurry.

This second slurry was coated on the previously formed phosphor layer using a knife coater, and butyl acetate was then forced to be evaporated to obtain the small particles layer.

Finally, a polyester film as a support having a thickness of 250 μm was bonded to the first phosphor layer to obtain the radiographic intensifying screen in accordance with the invention.

For the sake of comparison, further radiographic intensifying screens were prepared. More exactly, 60 parts by weight of calcium tungstate particles with an average grain size of 7.0 μm, 6 parts by weight of nitrocellulose and 34 parts by weight of butyl acetate were mixed together to obtain a slurry. This slurry was coated on the same protective film as in Example 1. The amount of the slurry used was same in Example 1. The same support as in Example 1 was bonded to the each phosphor layer thus formed, thus obtaining radiographic intensifying screens. These radiographic intensifying screens are referred to as Comparative Example 1.

EXAMPLES 2 and 3

Twenty parts by weight of phosphor consisting of calcium tungstate particles of average grain sizes shown in the Table in the proportions as shown, 2 parts by weight of nitrocellulose as the binding agent, and 78 parts by weight of butyl acetate were mixed together to obtain a slurry.

The slurry was charged into a spreading frame placed on a polyester film as a protective film having a thickness of 10 μm and allowed to spread, and then dried to form a phosphor layer having a thickness of 50 to 250 μm. The slurry was used such that the weight of the phosphor layer was 25, 45, 65, 85 and 100 mg per $cm^2$ for respective Examples. That is, five different intensifying screens of different weights of the phosphor layer were prepared in each Example.

Finally, a polyester film as a support, having a thickness of 250 μm, was bonded to each phosphor layer so formed by means of thermal press, thus obtaining each radiographic intensifying screen.

TABLE

| | Average grain size (μm) | Percent by weight | Average grain size (μm) | Percent by weight | Average grain size (μm) | Percent by weight |
|---|---|---|---|---|---|---|
| Example 2 | 2.7 | 50 | 9.9 | 50 | — | — |
| Example 3 | 2.7 | 25 | 7.0 | 25 | 16.1 | 50 |
| Comparative Example 2 | 5.5 | 100 | — | — | — | — |
| Comparative Example 3 | 4.4 | 50 | 7.0 | 50 | — | — |

X-ray radiographing was carried out in the usual manner using the radiographic intensifying screens of Examples 1 to 3 and Comparative Examples 1 to 3, and the relationship between the relative sensitivity and weight of the phosphor applied and the relationship between the relative modulation transfer function and relative sensitivity were examined. More exactly, an X-ray film was sandwiched between a pair of radiographic intensifying screens of the same kind, and the system was set in a cassette. A water phantom with a thickness of 10 cm was placed in front of the cassette, and the cassette was irradiated with X-rays of 85 kV peak through the water phantom. The irradiated X-ray film was developed, and the sensitivity was measured. The relative modulation transfer function was measured using an X-ray chart of the Furn Company.

Figure 3:
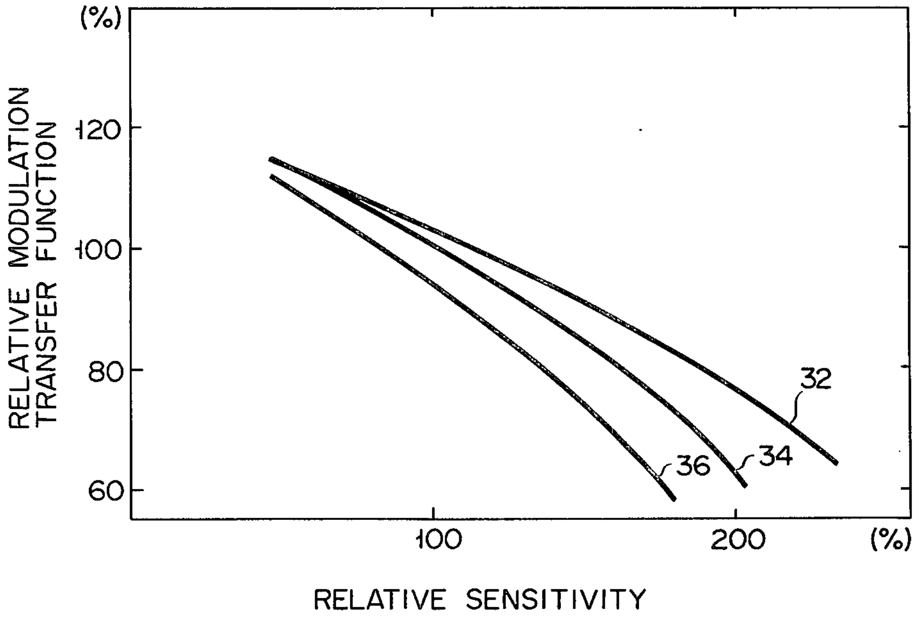
FIG. 3 is a graph showing the relationship between the relative modulation transfer function and relative sensitivity obtained with radiographic intensifying screens in accordance with the present invention in contrast with prior art radiographic intensifying screens.
Figure 2:
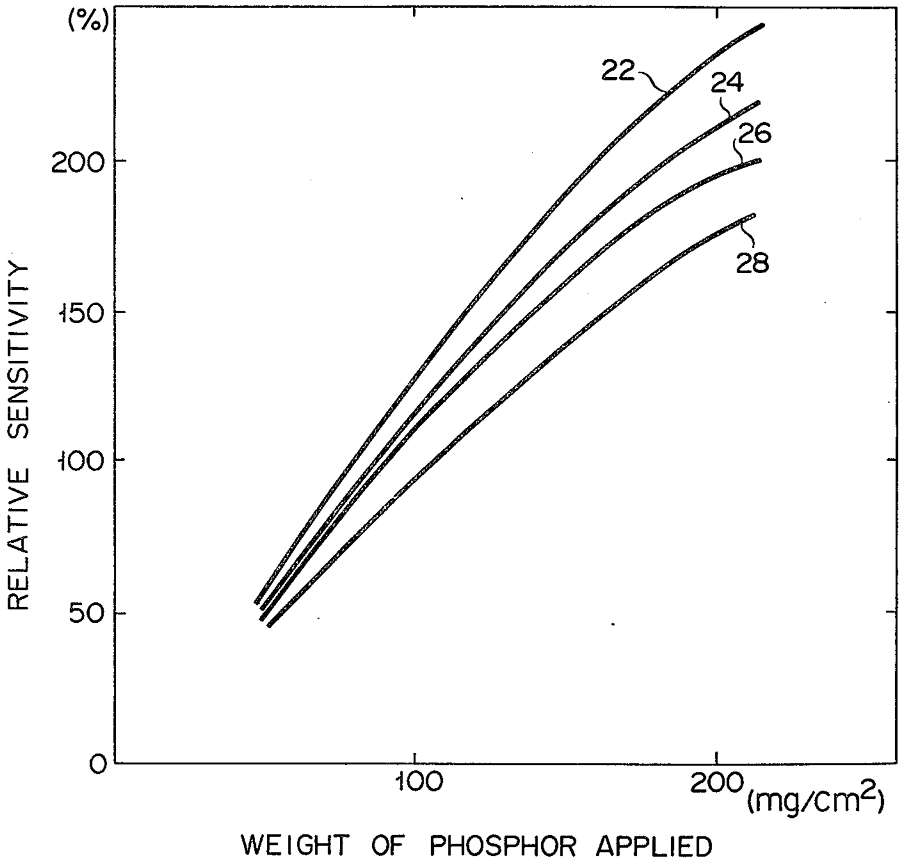
FIG. 2 is a graph showing the relationship between relative sensitivity and phosphor coating weight obtained with radiographic intensifying screens in accordance with the present invention in contrast with prior art radiographic intensifying screens.

The results are shown in FIGS. 2 and 3. In FIG. 2, the ordinate is taken for the relative sensitivity, and the abscissa is taken for the weight of the phosphor applied. The weight of phosphor represents the sum of the weights of phosphor in one set of, i.e., two, radiographic intensifying screens. Curves 22, 24, 26 and 28 in the chart represent the results of Example 3, Examples 1 and 2, Comparative Example 2 and Comparative Examples 1 and 3 respectively. That is, the curve representing the results of Example 1 and the curve representing the results of Example 2 substantially coincident. Also, the curve representing the results of Comparative Example 1 and the curve representing the results of Comparative Example 3 substantially coincident.

It will be seen from FIG. 2 that the radiographic intensifying screens according to the invention are superior in terms of sensitivity to the prior art radiographic intensifying screens.

In FIG. 3, the ordinate represents the relative modulation transfer function, and the abscissa is the relative sensitivity. Curve 32 in the Figure represents the results of Examples 1 and 2. That is, the curve representing the results of Example 1 and the curve representing the results of Example 2 substantially coincide. Curve 34 represents the results of Example 3 and Comparative Example 2, and curve 36 represents the results of Comparative Examples 1 and 3. It will be seen from FIG. 3 that the radiographic intensifying screens of Examples 1 and 2 are superior in modulation transfer function in comparison with the prior art radiographic intensifying screens. The radiographic intensifying screens of Example 3 and Comparative Example 2 have substantially the same modulation transfer function. The radiographic intensifying screen of Comparative Example 2 is produced by the spreading method using phosphor particles with an average grain size of 5.5 μm and having normal grain size distribution. Thus, a grain size distribution in the direction of the thickness of the radiographic intensifying screen is obtained because of the gathering of small phosphor particles to the side of the support and the gathering of large phosphor particles to the side of the protective film. Thus, the screen has improved modulation transfer function and sensitivity compared with the conventional radiographic intensifying screen (without any grain size distribution in the thickness direction). The phosphor in the radiographic intensifying screen of Example 3, on the other hand, contains 50% of comparatively large particles with an average grain size of 16.1 μm. For this reason, the modulation transfer function is thought to be no better than that of Comparative Example 2. However, the radiographic intensifying screen of Example 3 is far superior in terms of sensitivity compared with the radiographic intensifying screen of Comparative Example 2. In overall judgment, therefore, the radiographic intensifying screen of Example 3 is obviously superior. It is seen that if the average grain size of the large phosphor particles in the radiographic intensifying screen according to the invention is selected to be within a range of about 7 to 12 μm, improved modulation transfer function and sensitivity can be obtained in comparison with the prior art radiographic intensifying screen.

What we claim is:

1. A radiographic intensifying screen comprising:

a support;

a phosphor layer formed on said support; and a protective film formed on said phosphor layer, wherein said phosphor layer includes:

a small particles layer at its support side consisting essentially of small phosphor particles with an average grain size of about 4 μm or less and a binding agent; and a mixed particles layer at its protective film side consisting essentially of large phosphor particles with an average grain size ranging from about 7 to 20 μm, small phosphor particles present in the interstices of the large phosphor particles and with an average grain size of about 4 μm or less and a binding agent.

2. The radiographic intensifying screen according to claim 1, wherein the average grain size of said large phosphor particles ranges from about 7 to 12 μm.

3. The radiographic intensifying screen according to claim 1 or 2, wherein the weight ratio of said large phosphor particles to said small phosphor particles in said phosphor layer ranges from about 2:8 to 8:2.

4. The radiographic intensifying screen according to claim 3, wherein the thickness of said phosphor layer ranges from about 50 to 400 μm.

5. The radiographic intensifying screen according to claim 1, wherein the weight ratio of said large phosphor particles to said small phosphor particles in said mixed particles layer ranges from about 85:15 to 95:15.

* * * * *